United States Patent
Bronevetsky (10) Patent No.: US 11,775,267 B2
(45) Date of Patent: Oct. 3, 2023

(54) IDENTIFICATION AND APPLICATION OF RELATED SOURCE CODE EDITS

(71) Applicant: Google LLC, Mountain View, CA (US)

(72) Inventor: Grigory Bronevetsky, San Ramon, CA (US)

(73) Assignee: GOOGLE LLC, Mountain View, CA (US)

( * ) Notice: Subject to any disclaimer, the term of this patent is extended or adjusted under 35 U.S.C. 154(b) by 72 days.

(21) Appl. No.: 17/544,104

(22) Filed: Dec. 7, 2021

(65) Prior Publication Data
US 2023/0176838 A1    Jun. 8, 2023

(51) Int. Cl.
G06F 9/44    (2018.01)
G06F 8/38    (2018.01)
G06F 8/41    (2018.01)

(52) U.S. Cl.
CPC ............... G06F 8/38 (2013.01); G06F 8/433 (2013.01)

(58) Field of Classification Search
None
See application file for complete search history.

(56) References Cited

U.S. PATENT DOCUMENTS

2020/0104102 A1*  4/2020  Brockschmidt ....... G06F 40/232
2020/0371778 A1* 11/2020  Ni ............................ G06F 8/70
2022/0222047 A1*  7/2022  Todirel ................ G06F 11/3608
2022/0290989 A1*  9/2022  Bronevetsky .......... G06N 3/044
2022/0300850 A1*  9/2022  Mendez ................. G06N 20/00

OTHER PUBLICATIONS

Cubranic et al., "Hipikat: Recommending Pertinent Software Development Artifacts" Research Gate. Proceedings—International Conference on Software Engineering. Jan. 2003. 12 pages.
Gall et al., "Detection of Logical Coupling Based on Product Release History" International Conference on Software Maintenance. 1998. 10 pages.
Nguyen et al., "Using Topic Model to Suggest Fine-grained Source Code Changes" 2016 IEEE International Conference on Software Maintenance and Evolution. 11 pages.
Allamanis et al., "Learning to Represent Programs with Graphs" ICLR 2018. 17 pages.

(Continued)

Primary Examiner — Ted T. Vo
(74) Attorney, Agent, or Firm — Gray Ice Higdon (57) ABSTRACT

Implementations are described herein for identifying related source code edits to perform, or to aid in the performance of, various programming tasks. In various implementations, a first edit made to a first source code snippet in a source code editor may be detected. Based on the first edit, a second source code edit to be made to a second source code snippet may be identified. The identifying may include: traversing one or more graphs to determine one or more edge sequences between nodes corresponding to the first and second source code snippets, comparing the one or more edge sequences to a plurality of reference edge sequences between nodes corresponding to historical co-occurrences of the first and second code edits, and identifying the second edit based on the comparing. The source code editor may provide output that includes a recommendation to implement the second edit.

18 Claims, 8 Drawing Sheets

(56) References Cited

OTHER PUBLICATIONS

Yin et al., "Learning to Represent Edits" arXiv:1810.13337v2 [cs.LG] dated Feb. 22, 2019, 22 pages.
Ball et al.; "If Your Version Control System Could Talk . . . " 5 pages; dated 1997.
Zimmermann et al.; "Mining Version Histories to Guide Software Changes"; Saarland University; 10 pages; dated 2005.
Frein, Stephen; "Data science for developers: How to identify misses changes in source code" TechBeacon. Retreived from https://techbeacon.com/app-dev-testing/data-science-developers-how-identify-missed-changes-source-code. 21 pages; dated Aug. 17, 2021.

\* cited by examiner

AUTO EDIT RECOMMENDATIONS

GIVEN RECENT CHANGES MADE TO THE CODE BASE, WE HAVE IDENTIFIED A NUMBER OF SOURCE CODE SNIPPETS THAT WE RECOMMEND UPDATING AUTOMATICALLY.
PLEASE SELECT A FILENAME TO BE TAKEN TO THE FIRST FOUND SNIPPET IN THAT FILE, OR SELECT AN INDIVIDUAL FOUND PATTERN TO BE TAKEN DIRECTLY TO THE SOURCE CODE SNIPPET IN QUESTION.

<u>FOO.CC</u>
    XRANGE(X)→RANGE(X)
    X.KEYS(Y)→LIST(X.KEYS(Y))
<u>BAR.CC</u>
    XRANGE(X)→RANGE(X)
    X.XRANGE(Y)→LIST(X.RANGE(Y))
    XRANGE(X)→RANGE(X)
    XRANGE(X, Y)→RANGE(X, Y)
.
.
.

IDENTIFICATION AND APPLICATION OF RELATED SOURCE CODE EDITS

BACKGROUND

Source code maintenance often includes code migration, which can be time consuming and expensive. Some large code bases may require numerous years' worth of engineer and/or programmer time in order to be migrated from one version to another. This type of work is often considered tedious and/or cumbersome, and can lead to mistakes being made and/or failure to implement transformations that are critical to the migration. For example, some types of source code edits may commonly co-occur with other types of source code edits, e.g., because they are related to each other. The co-occurring source code may not necessarily be syntactically similar. Nonetheless, failure to make these types of related source code edits consistently can lead to errors or other negative outcomes.

SUMMARY

Implementations are described herein for identifying related source code edits to perform, or to aid in the performance of, various programming tasks. In various implementations, edits made to source code in a code base may be analyzed to identify groups (e.g., pairs, triplets, etc.) of source code edits that tend to be implemented at or near the same time, e.g., contemporaneously, within the same timeframe, as part of a singular effort, etc. These groups of co-occurring source code edits may be considered to be potentially related, and therefore may be used, for instance, to recommend source code edits.

In some implementations, a method implemented using one or more processors may include: detecting a first edit made to a first source code snippet in a source code editor; identifying a second edit to make to a second source code snippet, and causing the source code editor to provide output, wherein the output comprises a recommendation to implement the second edit. In some implementations, the identifying includes: traversing one or more graphs to determine one or more edge sequences between nodes corresponding to the first and second source code snippets, comparing the one or more edge sequences to a plurality of reference edge sequences between nodes corresponding to historical co-occurrences of the first and second code edits, and identifying the second edit based on the comparing.

In various implementations, one or more of the graphs may include a source code dependency graph between a first source code file containing the first source code snippet and a second source code file containing the second source code snippet. In various implementations, one or more of the graphs may include a file system tree that includes a first source code file containing the first source code snippet and a second source code file containing the second source code snippet. In various implementations, one or more of the graphs may include an abstract syntax tree generated based on the first and second source code snippets. In various implementations, one or more of the graphs may include a control flow graph or call graph generated based on the first and second source code snippets.

In various implementations, the comparing may include comparing one or more counts of the one or more edge sequences with a plurality of counts of the plurality of reference edge sequences. In various implementations, the comparing may include comparing node sequences connected by the one or more edge sequences with a plurality of node sequences connected by the plurality of reference edge sequences. In various implementations, the identifying may include determining that one or more edge sequences match reference edge sequences of at least a threshold number or percentage of the historical co-occurrences of the first and second code edits.

In various implementations, the nodes corresponding to the first and second source code snippets may include semantic embeddings generated based on the first and second source code snippets. In various implementations, the nodes corresponding to the first and second source code snippets may include semantic embeddings generated based on comments that accompany the first and second source code snippets.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for identifying related source code edits to perform, or to aid in the performance of, various programming tasks. In various implementations, edits made to source code in a code base may be analyzed to identify groups (e.g., pairs, triplets, etc.) of source code edits that tend to be implemented at or near the same time, e.g., contemporaneously, within the same timeframe, as part of a singular effort, etc. These groups of co-occurring source code edits may be considered to be potentially related, and therefore may be used, for instance, to recommend source code edits.

In some implementations, source code edits may be recommended in real time, e.g., as a programmer operates a source code editor to make a first change to a first source code snippet. For example, techniques described herein may be implemented in real time to identify and recommend other edits that typically co-occur with the edit the programmer just made. Additionally or alternatively, in some implementations, source code edit recommendations may be provided en masse, e.g., periodically, when a source code file is opened using a source code editor, after a large commit is implemented in a version control system (VCS), etc.

Various techniques may be used to identify groups of co-occurring—and hence, likely related—source code edits. Generally, the terms "co-occur" and "co-occurring" may refer to source code edits that are made contemporaneously, within the same time frame (e.g., n minutes, m hours, x days, y weeks, etc.), as part of a single programming session by one or more programmers (e.g., workday of one or more programmers, during an unbroken time interval when a programmer was logged in to an account or system, an instance when the programmer operated IDE 111 without interruption, etc.), between various events (e.g., between VCS commits, between compilations, between patch applications, etc.), between source code versions (e.g., 1.10.2 and 1.10.3), etc. In some implementations, timestamps associated with source code edits (e.g., when source code files are saved, as the edits are made, etc.) may be used to identify candidate groups of co-occurring source code edits that may be related.

However candidate groups of source code edits are identified, in various implementations, the source code edits within a candidate group may be further analyzed to determine whether they are truly related. For instance, in some implementations it may be determined whether the number of instances where the source code edits co-occur is a large enough proportion of the total number of instances where each source edit occurs individually. If the number of instances where the source code edits co-occur is a relatively low fraction or percentage of the total number of instances where the source code edits were made, that may suggest little or no relationship between the edits. By contrast, if the number of instances where the source code edits co-occur is a relatively large fraction or percentage of the total number of instances where the source code edits were made, that may suggest a relationship between the edits.

In some implementations, one or more graphs may be used to identify related source code edits. For example, one or more graphs may be traversed from a node that corresponds to a first code edit to a node that corresponds to a co-occurring second code edit. One or more edge sequences (which may be expressed as sequences of edges if the edges are labeled, or sequences of nodes otherwise) determined from this traversal may be compared with other edge sequences between nodes corresponding to other co-occurrences of the first and second code edits. If a threshold number (or percentage) of matching or sufficiently similar edge sequence are found, that may suggest a relationship between the first and second code edits.

The graphs used to identify likely-related source code edits may take various forms. In some implementations where the first and second code edits are contained in different files, a file system tree or source code dependency graph that includes both files may be used to compare edge sequences. In some implementations, graphs that are generated during the compilation process may be used. For example, an abstract syntax tree (AST) or control flow graph (CFG) such as a call graph may be used to map the code edits to each other. Either of these graphs—or any other type of graph that can be used to represent source code—may provide edge sequences between source code edits that can be analyzed to determine whether code edits are related.

In some implementations, graphs having nodes that correspond to something other than source code may be leveraged. For example, a graph may be assembled that includes nodes that correspond to each member of a programming team. Such a graph may or may not include nodes representing other entities, such as source code snippets or files, departments, geographic locations, business entities, divisions, etc. When a first team member makes an edit to source code, edits made by other members contemporaneously or within some time interval (e.g., hours, a day, a work week, etc.) may be analyzed using techniques described herein to determine whether the edit made by the first member is related to edits made by the other members. For example, the first member may be in charge of a particular portion of the source code, whereas other members are in charge of other portions of the source code. When the team as a whole receives a directive to make a change to the code base, source code edits made by the first member in response to the directive may consequently co-occur with—and hence may be related to—source code edits made by the other members in response to the directive. Later, when semantically-similar directives are issued, but perhaps a team member didn't receive the directive directly, that team member may still be provided with a recommendation of source code edit to make, based on the edit's relatedness to other source code edits made by other team members.

As another example, additional signals, in addition to or instead of the source code edits themselves, may be used to determine whether source code edits are related. For example, natural language comments that often accompany source code snippets, or changes made thereto, may be encoded—with or without the commented-on source code—into semantic embeddings that succinctly represent the semantic context of the source code snippet or an edit thereto. These semantic embeddings may be used as nodes in one or more of the aforementioned graphs to determine edge sequences, and hence, related code edits. Encoding comments into semantic embeddings in this manner may strip away syntactic differences between source code snippets and/or edits of source code snippets, enabling more robust comparison of source code edits that appear syntactically different but are, in fact, related. Various types of machine learning models may be trained and used to perform such encoding, such as encoder-decoder networks (e.g., with the encoder portion being used to create the embedding), transformer networks, various types of recurrent neural networks (e.g., long short-term memory, gated recurrent unit), and so forth.

Related source code edits may be identified in real time or learned ahead of time (e.g., in batches). In the former case, as a user makes an edit to a snippet of source code, similar edits made to the code base historically may be searched for and used to generate one or more of the aforementioned graphs on the fly. The graphs may then be analyzed to determine whether the edit made by the user typically co-occurs with (and hence, is likely related to) other source code edits. In the latter case, one or more aforementioned graphs may be stored in one or more databases. If reference edge sequence(s) in the database suggest that the user's edit typically co-occurs with other edit(s), those other edits may be recommended.

Figure 1:
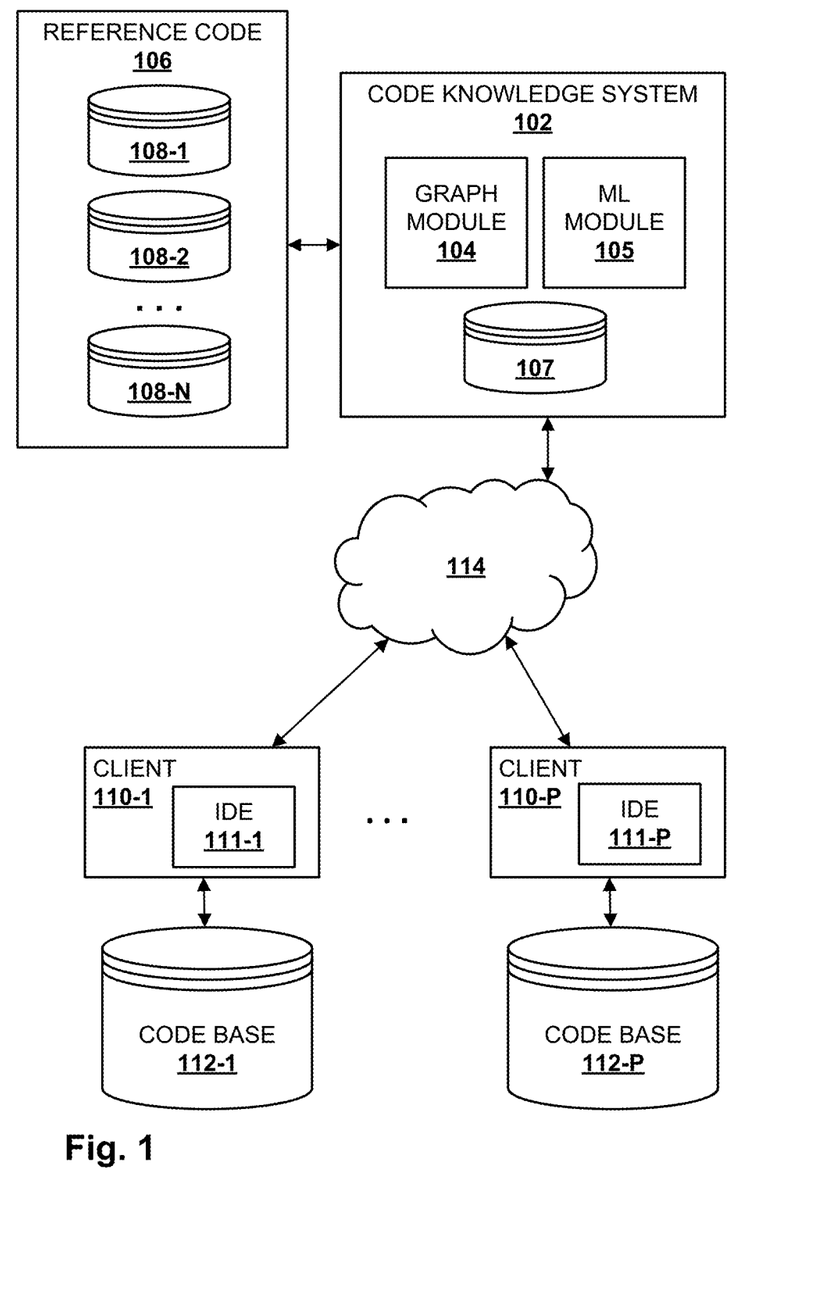
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be operably coupled with clients 110-1 to 110-P via one or more computer networks (114) to help clients 110-1 to 110-P manage their respective code bases 112-1 to 112-P. In other implementations, code knowledge system 102 may be implemented locally at a client 110. Code knowledge system 102 may include, among other things, a graph module 104 that is configured to perform selected aspects of the present disclosure in order to help one or more clients 110-1 to 110-P to manage and/or make changes to one or more corresponding code bases 112-1 to 112-P. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

Graph module 104 may be configured to leverage prior source code transformations contained in reference code 106 to facilitate identification and use of related source code edits, e.g., to aid clients 110-1 to 110-P in editing, updating, replatforming, migrating, or otherwise acting upon their code bases 112-1 to 112-P. In some implementations, reference code 106 may include multiple different corpuses 108-1 to 108-N of source code that can be leveraged in this manner. These corpuses 108-1 to 108-N may be publicly available, proprietary, stored on a cloud, stored in a version control system (VCS), and so forth.

In some examples, one or more corpuses 108 of reference code 106 may include pre-edit and post-edit versions of source code that exist prior to and after source code is edited. For example, a VCS may store all or at least some previous versions of source code. Based on analysis of these pre- and post-edit versions of source code, graph module 104 may use graphs to identify source code edits that are related, e.g., temporally and/or semantically, based on edge sequences in those graphs. In some implementations, graph module 104 may build a library 107 of reference edge sequences corresponding to related source code edits (or more generally, source code snippets). These reference edge sequences may be used subsequently to automate editing of source code, e.g., by providing source code edit recommendations on the fly, in batches, etc.

In some implementations, each client 110 may include an integrated development environment (IDE) 111 that can be used to edit/write source code. In other implementations, other applications may be used to edit source code, such as a simple text editor, a word processing application, a source code editor application with specific functionality to aid in computer programming, etc. Whether a programmer uses a standalone source code editor application or a source code editor module of an IDE 111, in many cases, the source code the programmer sees may be visually annotated, e.g., with different tokens being rendered in different colors to facilitate ease of reading. In some implementations, the source code editor may include extra functionality specifically designed to ease programming tasks, such as tools for automating various programming tasks, a compiler, real time syntax checking, etc. In some implementations, techniques described herein may enhance aspects of this extra functionality provided by a source code editor (whether a standalone application or part of an IDE), e.g., by generating and/or recommending source code edit suggestions based on various signals, such as edits being made by a user currently, a particular file the user is editing, etc.

In various implementations, code knowledge system 102 may include a machine learning ("ML" in FIG. 1) module 105 that has access to data indicative of one or more trained machine learning models (not depicted). These trained machine learning models may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network ("RNN", e.g., long short-term memory, or "LSTM", gate recurrent units, or "GRU", etc.), and any other type of machine learning model that may be applied to facilitate selected aspects of the present disclosure.

In some implementations, ML module 105 may apply these machine learning models to source code snippets and/or edits made to source code snippets previously in order to generate semantically-rich embeddings. For example, in various implementations, ML module 105 may apply a machine learning model such as a GNN or an encoder portion of an autoencoder to a source code snippet and/or an edit made thereto to generate an embedding (or feature vector) representation of the source code snippet and/or the edit made to the source code snippet. When a graph-based machine learning model such as a GNN is applied, the source code being encoded may be represented in the form of a graph, such as an abstract syntax tree (AST) or control flow graph (CFG) such as a call graph. In some implementations, other data associated with the source code snippets, such as inline comments, comments submitted as part of a VCS commit, an identifier of the programmer who made the edit, and so forth, may also be encoded with the source code snippets to increase the semantic richness of the embedding.

Code knowledge system 102 may identify source code edits as being related in a variety of different ways. As noted previously, in some implementations, two or more source code edits may be related if a number of instances in which those source code edits co-occur constitutes a threshold percentage or amount of a total number of instances those source code edits occur individually. Such a technique may be somewhat cumbersome when dealing with large code bases 112, however, because the search space of source code edits that may or may not co-occur with a given code edit may be large. Moreover, such a technique does not take into account structural relationships between the edited source code snippets. This may lead to coincidentally co-occurring source code edits being identified as related, even if they really are not.

Accordingly, in other implementations, code knowledge system 102 may leverage graph module 104 to more efficiently and/or accurately identify related source code edits. In various implementations, graph module 104 may use various types of graphs to identify edge sequences between nodes that correspond to co-occurring source code edits. These nodes may include, for instance, edited source code snippets, embeddings generated by ML module 105 based on these edited source code snippets, etc. The graphs may take various forms as well. Some graphs, such as ASTs or CFGs, may be generated as part of a source code compilation process. Other graphs may be based on relative locations of source code snippets within a file directory tree, e.g., with child-having nodes corresponding to directories, and leaf nodes corresponding to files contained in those directories. Yet other graphs may include nodes that correspond to people, such as members of a team of programmers.

In various implementations, graph module 104 may use one or more of the aforementioned graphs to determine edge sequences between nodes corresponding to source code edits in candidate groups of source code edits. These edge sequences may then be examined, e.g., by graph module 104 or code knowledge system 102 generally, to determine whether members of the candidates group of source code edits are related to each other. For example, code knowledge system 102 may determine a total number of instances when two or more source code edits co-occur. Code knowledge system 102 may then determine whether any edge sequences between those two or more co-occurring source code edits satisfy some threshold number or percentage of the total number of instances. If the threshold is satisfied by a particular edge sequence, then the two or more source code edits may be deemed related.

Figure 2:
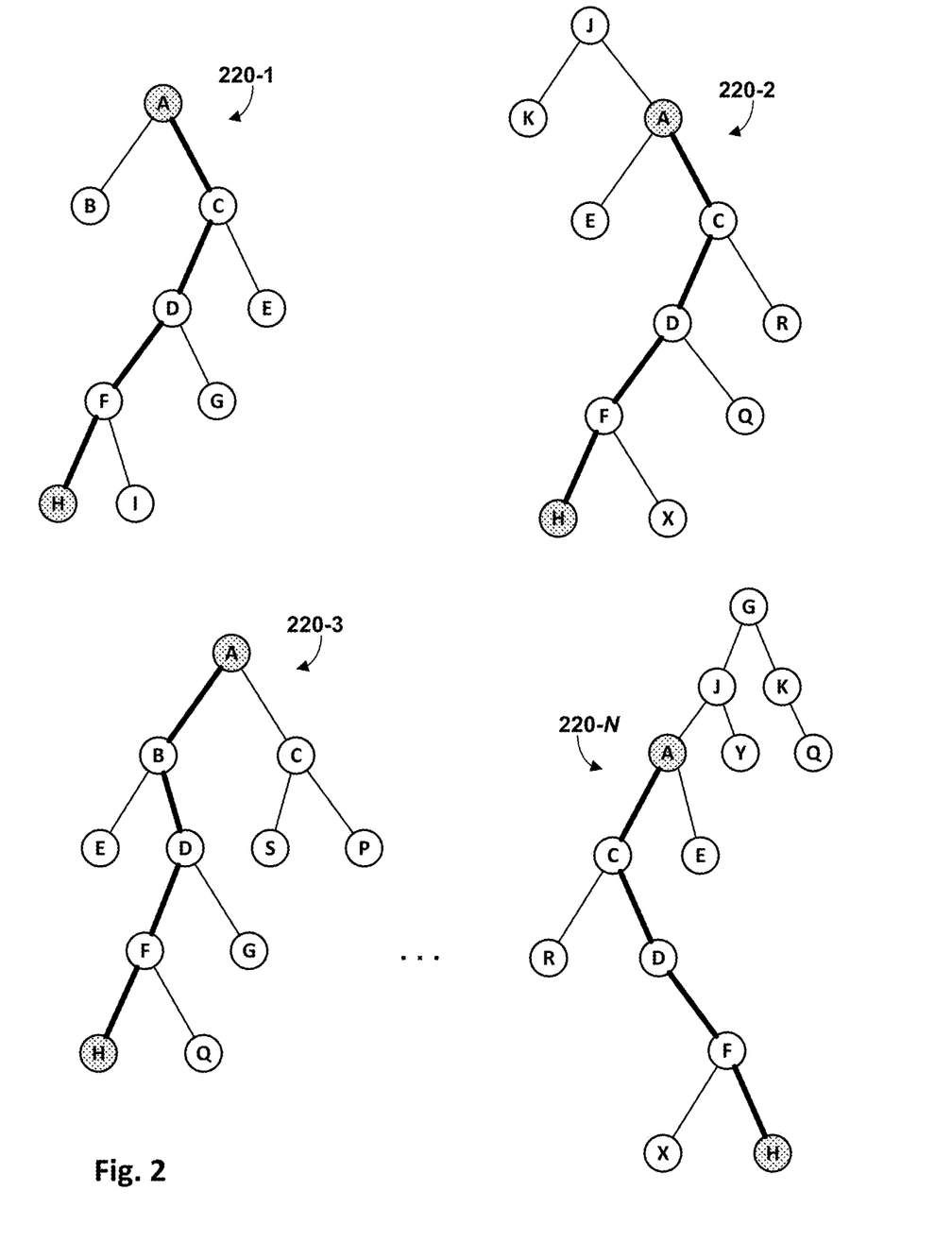
FIG. 2 schematically demonstrates an example of how aspects of the present disclosure may be implemented, in accordance with various implementations.

FIG. 2 schematically demonstrates an example of how graphs may be leveraged to identify related source code edits, in accordance with various implementations. In FIG. 2, a plurality of graphs 220-1 to 220-N are depicted that represent N (positive integer) instances of a source code edit A co-occurring with a source code edit H. Graphs 220-1 to 220-N may take various forms. In some instances, graphs 220-1 to 220-N may be ASTs or CFGs that are generated during a process of compiling source code underlying graphs 220-1 to 220-N. In other instances, graphs 220-1 to 220-N may take the form of dependency graphs. Other types of graphs are contemplated. For example, a modeling language such as the Unified Modeling Language (UML) may be used to generate a UML diagram that can then be analyzed using techniques described herein to identify related source code edits. Edge sequences between nodes corresponding to source code edits are bolded for illustrative purposes.

Each node of each graph 220 may represent, include, or otherwise correspond to a source code edit and/or an edit to the source code snippet. As one non-limiting example, a pair that includes a pre-edit and post-edit source code snippet may be encoded, e.g., by ML module 105, into a semantically-rich embedding. As another example, a change graph may be generated based on the edit, and the change graph may be represented as is or encoded into an embedding using a graph-based machine learning model such as a GNN. Nodes of graph 220 (and of other graphs generally) may also encode other information, such as an identifier of a programmer who wrote, or last edited, the source code snippet represented by the node.

In first graph 220-1, an edge sequence between the node representing source code edit A and the node representing source code edit H can be represented as {A, C, D, F, H}. As noted previously, edge sequences can be expressed as a sequence of edges or, if the edges are unnamed, sequences of nodes that are connected by the edges. Edges of this sequence are drawn thicker than other edges. In second graph 220-2, an edge sequence between the node representing source code edit A and the node representing source code edit H can be represented once again as {A, C, D, F, H}, even though second graph 220-2 is different from first graph 220-1. In third graph 220-3, an edge sequence between the node representing source code edit A and the node representing source code edit H can be represented as {A, B, D, F, H}. In Nth graph 220-N, an edge sequence between the node representing source code edit A and the node representing source code edit H can be represented once again as {A, C, D, F, H}.

In FIG. 2, first graph 220-1, second graph 220-2, and Nth graph 220-N generated identical edge sequences. Third graph 220-3 generated a different edge sequence. Depending on the threshold (which may be set manually, established empirically, altered over time) and the number N of available graphs (and hence, edge sequences), the fact that three graphs generated the same edge sequence {A, C, D, F, H} may or may not suffice for a determination that first and second code edits represented by nodes A and H, respectively, are related. For example, if N=4 and the threshold is 95%, then no relationship may be identified between the source code edits represented by nodes A and H. Intuitively, the sample size may be too small, or the percentage of outlying edge sequences may be too great to identify a relationship. By contrast, if N=100 and all un-depicted graphs 220-4 to 220-99 also include edge sequence A-C-D-F-H between nodes A and H, a relationship may be identified between the source code edits represented by nodes A and H. Subsequently, when a user makes a source code edit that matches or corresponds to the source code edit(s) represented by node A, the user may receive a recommendation to also make the source code edit recommended by the node H.

In some implementations, embeddings generated for source code snippets underlying each node in the graphs of FIG. 2 may be leveraged to generate additional edges, or even entirely new graphs that can be analyzed as described herein to identify related code edits. For example, for each node in a graph, the underlying source code may be encoded into an embedding, e.g., by ML module 105. In some cases, this may include ML module 105 using a graph-based machine learning model such as a GNN autoencoder to encode the entire graph into an embedding representing the whole graph, and then to decode that embedding back into the original graph, e.g., with each node now having an embedding representing its own underlying source code snippet and surrounding context.

In other implementations, ML module 105 may apply a textual embedding model such as word2vec to convert the source code snippets underlying the nodes into respective embeddings. In either case, if the embeddings (or vectors) associated with two or more given nodes are sufficiently similar, e.g., measured using techniques such as Euclidean distance or cosine similarity, an edge may be added between those nodes, either to augment the existing graph (e.g., AST, CFG) or as an edge in an entirely new graph. This augmented or new graph may then be analyzed as described herein to determine edge sequences between code edits. Those edge sequences may then be used to identify related code edits.

Figure 3:
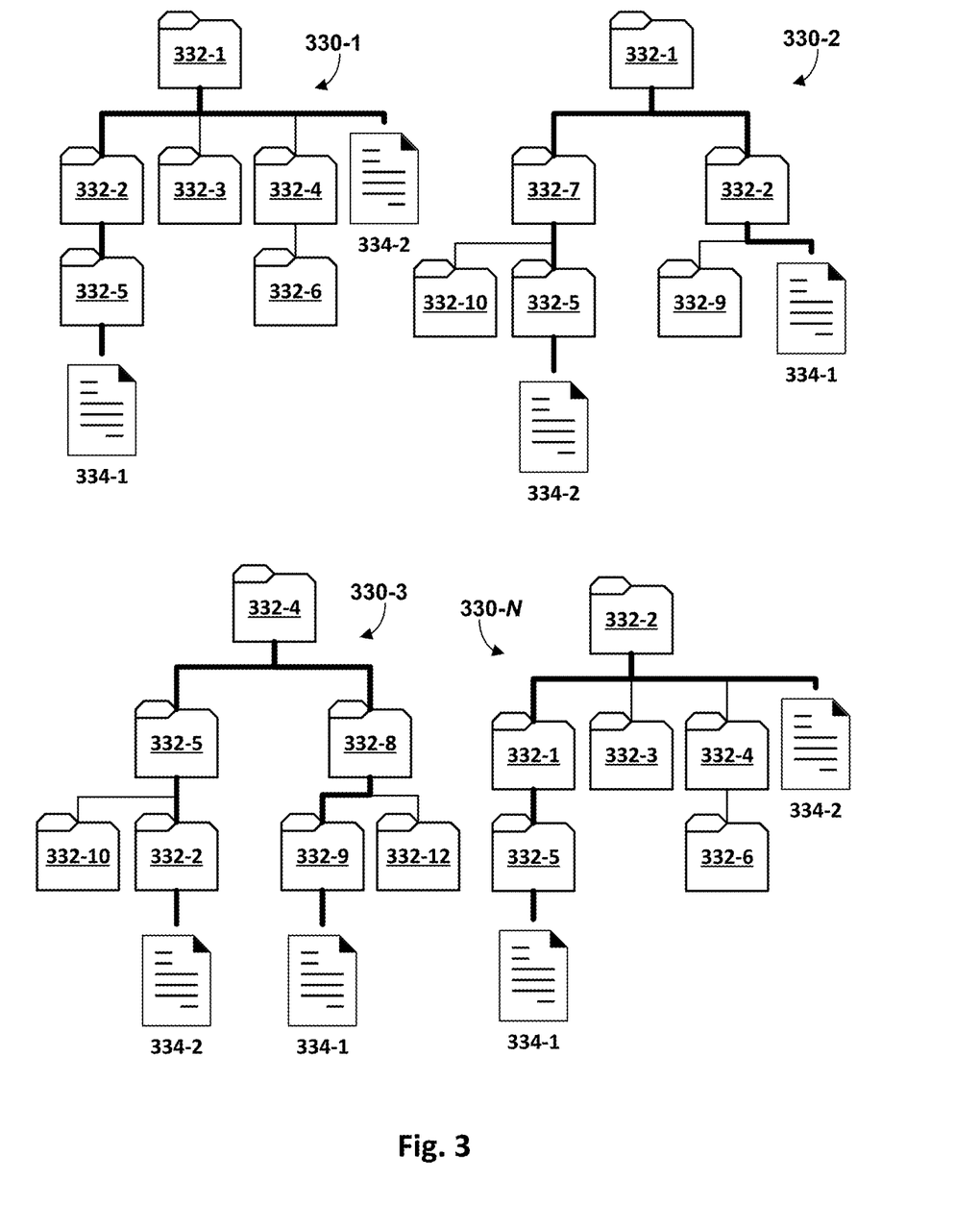
FIG. 3 schematically demonstrates another example of how aspects of the present disclosure may be implemented, in accordance with various implementations.

FIG. 3 depicts an alternative way to leverage graphs to identify related source code edits. As in previous examples, if edge sequences between nodes corresponding to co-occurring source code edits match, the likelihood increases that the source code edits connected by those edge sequences are related. In FIG. 3, graphs in the form of trees 330-1 to 330-N (N being a positive integer) represent file system trees corresponding to, for instance, all or part of an operating system's file management directory structure, or a VCS's file management directory structure. Thus, it can be seen that some nodes 332 correspond to directories, and other nodes 334 correspond to individual files. In the present context, individual files may be text files or other types of files that contain, and can be used to edit, source code. In reality, these file system trees would likely include far greater numbers of both directories and files. However, for the sake of simplicity, only a few files and a relatively small number of directories are depicted in FIG. 3. Edge sequences are bolded once again for illustrative purposes.

For illustrative purposes, and referring to first tree 330-1 at top left, assume that a programmer made a first edit to a first file corresponding to node 334-1 and a second edit to a second file corresponding to node 334-2. First and second files 334-1, 334-2 may be, for instance, text files that contain source code in one or more languages, such as C, C++, Java, Python, PHP, Perl, Basic, or any other programming language. As shown in tree 330-1, an edge sequence between first file 334-1 and second file 334-2 includes: ES-1={334-1, 332-5, 332-2, 332-1, 334-2}.

A second tree 330-2, which may correspond to another file system/VCS that includes first and second files 334-1, 334-2, may include a different edge sequence between first and second files: ES-2={334-1, 332-2, 332-1, 332-7, 332-5, 334-4}. Assuming co-occurring edits are made to first and second files 334-1, 334-2, in various implementations, this second edge sequence ES-2 may or may not be considered a match to the first edge sequence ES-1 based on a variety of criteria, user preferences, a measure of "fuzziness" permitted for matching, etc. For example, if matching requires exact identity between edge sequences, then the first and second edge sequences ES-1, ES-2 would not be considered matches.

On the other hand, if matching allows for one edge sequence to be an unordered subset of the other, then first and second edge sequences ES-1, ES-2 would be considered matches. Every node of first edge sequence ES-1 is also included in second edge sequence ES-2, albeit in a different order. The fact that second edge sequence ES-2 includes an additional node 332-7 that is not found in first edge sequence ES-1 may be immaterial. Under similar circumstances, if identical order were required, then first and second edge sequences ES-1, ES-2 would not be considered matches because the orders of edges or nodes between first and second edge sequences ES-1 and ES-2 are different.

A third tree 330-3 that includes first and second files 334-1, 334-2 has a somewhat different directory structure. In particular, the edge sequence ES-3 between first and second files 334-1, 334-2 is: {334-1, 332-9, 332-8, 332-4, 332-5, 332-2, 334-4}. In some implementations, ES-3 may not be considered a match to ES-1 or ES-2 because, for instance, it lacks directory node 332-1, is in a completely different order, and includes numerous additional nodes (e.g., 332-9, 332-8, 332-4), etc. However, if edge sequence matching is set to be highly fuzzy, then perhaps these edge sequences could match because they share at least some nodes in common (332-5 and 332-2).

A fourth tree 330-4 that includes first and second files 334-1, 334-2 has yet another directory structure. In particular, the edge sequence ES-4 between first and second files 334-1, 334-2 is: {334-1, 332-5, 332-1, 332-2, 334-2}. Third edge sequence ES-4 is almost identical to first edge sequence ES-1 except the order is slightly different. Assuming the criteria for matching do not require the same order, ES-4 may be deemed a match to ES-1, and possibly to ES-2 as well.

Figure 4:
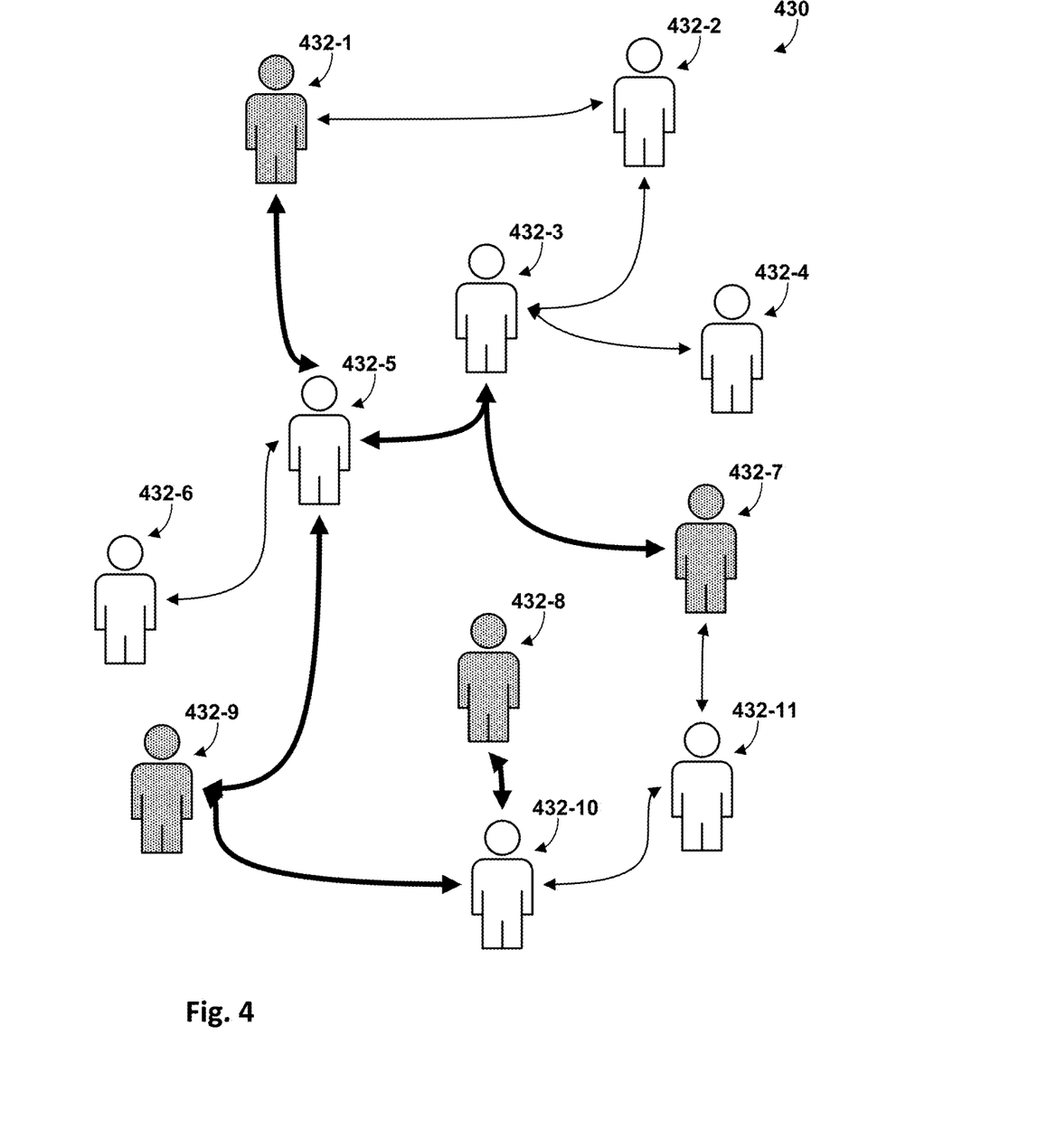
FIG. 4 schematically demonstrates another example of how aspects of the present disclosure may be implemented, in accordance with various implementations.

Graphs leveraged using techniques described herein to identify related source code edits are not limited to the graphs depicted in FIGS. 2-3. Graphs may include other types of nodes and edges that represent, for instance, relationships between entities that edit source code snippets. FIG. 4 depicts one such example of how a graph 430 may be constructed and/or leveraged using people instead to determine whether co-occurring source code edits are related. FIG. 4 also depicts an example where more than two co-occurring source code edits are identified as related.

In FIG. 4, graph 430 includes nodes 432-1 to 432-11 that each represents and/or corresponds to a person. The people may include, for instance, programmers that work on the same code base. Edges of graph 430 may correspond to relationships between these programmers. These relationships may include, for instance, official relationships dictated by an employer, departmental relationships, intra-company social networking relationships, etc. There is no requirement that the programmers all work for the same entity. For example, the code base may be a crowd-sourced, open source, and/or other type of code base that allows any number of programmers who may not be affiliated with each other officially to contribute. In some such examples, a more traditional social network may be used to construct a graph between otherwise unaffiliated programmers.

Suppose a first programmer 432-1 makes a first edit to a first source code snippet (not depicted) during the same timeframe (e.g., during the same day, week, same software version, etc.) as a seventh programmer 432-7 makes a second edit to a second source code snippet (not depicted). Likewise, an eighth programmer 432-8 and a ninth programmer 432-9 also make edits to respective source code snippets (not depicted) during the same timeframe. In various implementations, an edge sequence may be derived from these events by, for instance, identifying a shortest path(s) and/or subtree/subgraph between all of the nodes (programmers) that made a source code edit. In FIG. 4, for example, the following edge sequence (or subtree or subgraph—bolded in FIG. 4) may be identified: {432-1, 432-5, 432-3, 432-7, 432-9, 432-10, 432-8}. If this sequence/subtree/subgraph is sufficiently similar to other reference sequences/subtrees/subgraphs that connect other related source code edits, the code edits made by programmers 432-1, 432-7, 432-8, and 432-9 may be deemed related.

The graphs of FIGS. 2-4 are depicted as separate examples for illustrative purposes. However, this is not meant to be limiting. In various implementations, aspects of these various types of graphs may be used together to determine whether co-occurring source code edits are truly related. For example, and as mentioned previously, a programmer's identifier (e.g., name, badge number) may be encoded into an embedding, along with a source code edit they made, to further enrich the embedding semantically. The programmer's identity may then be used subsequently as another signal to determine whether two or more source code edits are truly related. In this way, aspects of a graph like that of FIG. 4 may be combined with aspects of other graphs similar to those in FIGS. 2-3.

Figure 5:
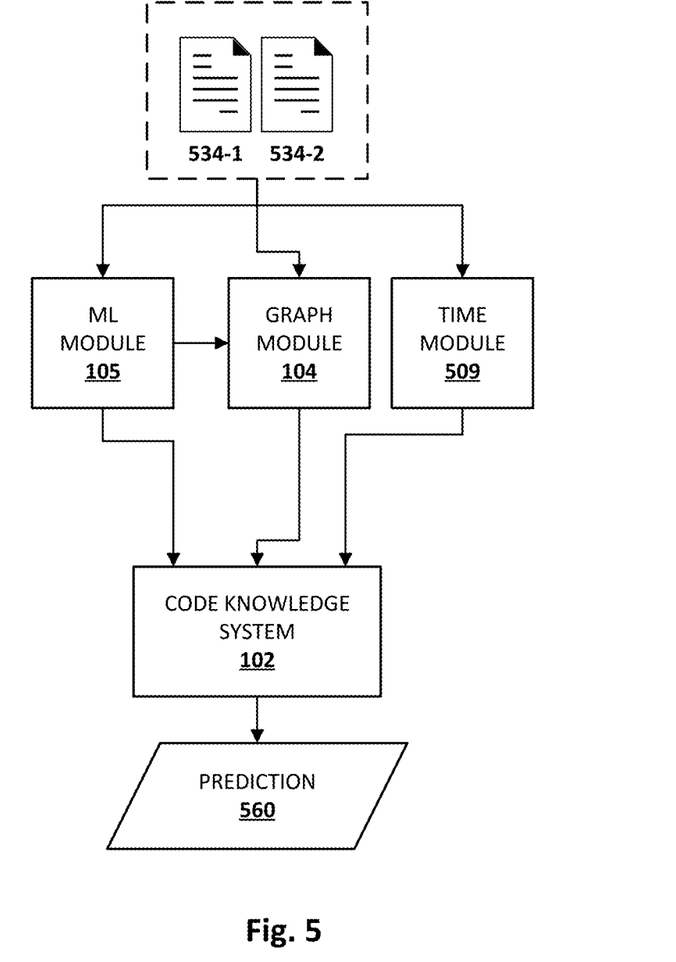
FIG. 5 schematically depicts an example of how various components may interact to perform selected aspects of the present disclosure.

FIG. 5 schematically depicts one example of how code knowledge system 102 may leverage a variety of different signals to make a prediction 560 of whether two source code edits 534-1 and 534-2 that occur in the same timeframe are related. In this example, ML module 105 may use one or more machine learning models to encode the source code edits 534-1, 534-2 and/or other contextual data (e.g., inline comments, programmer identifier) into semantically-rich embeddings. As depicted by the left-to-right arrow, in some implementations, ML module 105 may pass these encodings to graph module 104, e.g., so that graph module 104 can incorporate these embeddings into nodes.

Additionally or alternatively, in some implementations, ML module 105 may provide its own signal indicative of whether or not the source code edits 534-1, 534-2 are related. Suppose the source code edits 534-1, 534-2 are each annotated with inline comments that describe a common origin, e.g., a customer request, security update, API compatibility update, etc. If these inline comments are included in the embeddings generated by ML module 105, those embeddings may be more similar to each other, e.g., by being more proximate to each other in embedding space. Similarity between embeddings may be determined, for instance, using techniques such as Euclidean distance, dot product, cosine similarity, etc.

Additionally or alternatively, in many cases, source code edits that are truly related to each other may be semantically and/or syntactically similar, notwithstanding any inline comments that may or may not be present. Whichever the case, ML module 105 may provide a signal indicative of semantic similarity between source code edits 534-1, 534-2. Code knowledge system 102 may or may not use these signal(s) in conjunction with other signal(s) to determine whether source code edits are related. In some implementations in which reference edge sequences for reference source code edits are available for comparison, ML module 105 may also compare embeddings generated from current source code edits under consideration to embeddings generated from those reference source code edits.

Other signal(s) code knowledge system 102 may use to determine whether source code edits are related include signal(s) generated by graph module 104 and/or a time module 509. Code knowledge system 102 may weigh these various signals in various ways depending on a variety of factors, such as a measure of tolerance for erroneously-matched source code edits. The signal(s) generated by graph module 104 may be indicative of whether edge sequences between nodes corresponding to the source code edits 534-1, 534-2 in graph(s) (examples described previously) match or are sufficiently similar to reference edge sequences between nodes corresponding to historically-related source code edits.

While not depicted in FIG. 1, time module 509 may be part of code knowledge system 102. Among other things, time module 509 may be configured to determine whether two or more source code edits qualify as "co-occurring," and therefore are worthy of consideration as potentially being related. In some implementations, time module 509 may also be configured to provide signal(s) indicative of an amount of time between source code edits. Intuitively, the greater the amount of time between the source code edits, the less likely those source code edits are related to each other.

Figure 6:
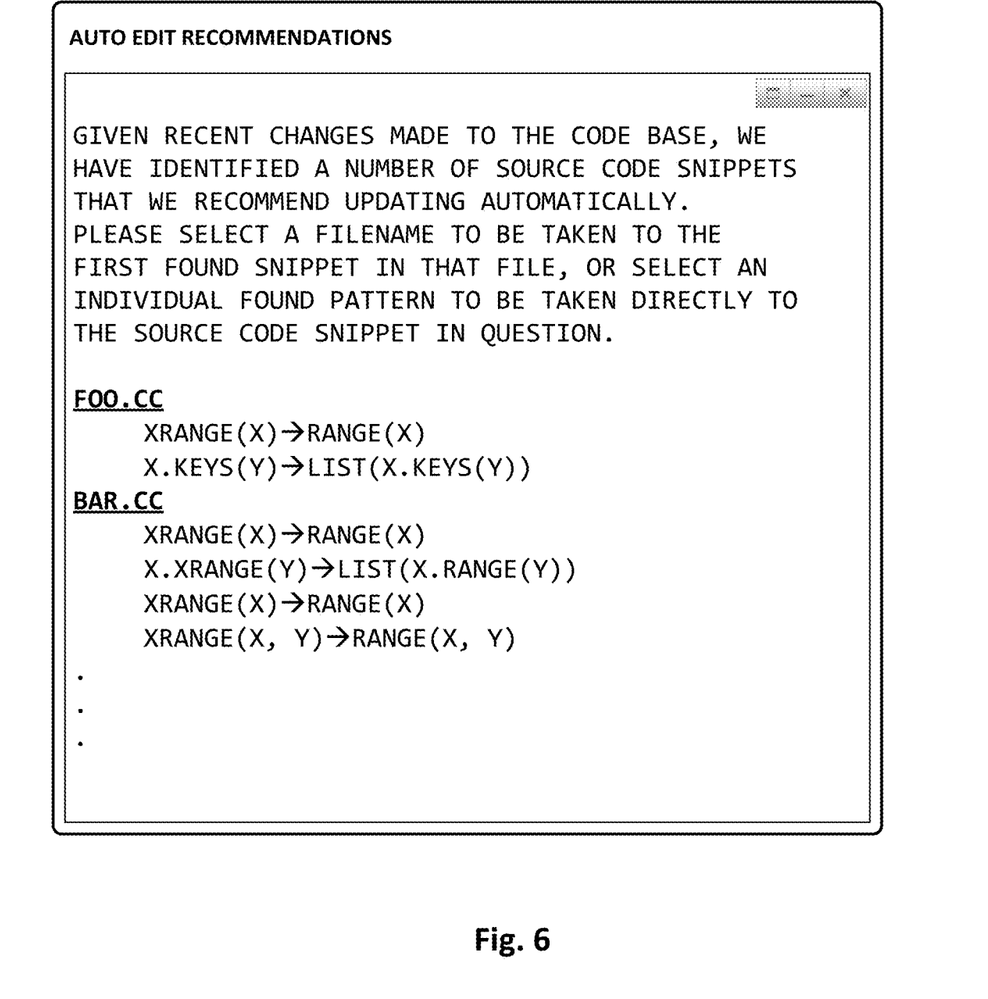
FIG. 6 depicts an example graphical user interface (GUI) that may be presented in accordance with various implementations described herein.

FIG. 6 depicts an example GUI that may be presented to a user to recommend one or more auto edits, and for facilitating navigation to relevant portions of source code for potential transformation. In this example, a number of source code snippets have been identified using techniques described herein as being related to recent changes made to a code base. For example, recent source code edits to the code base have been matched—e.g., using edge sequences determined by graph module 104 and/or the other signals depicted in FIG. 5—to other source code edits that were made historically, but have not yet been made to the current code base.

For example, the file "foo.cc" includes two source code snippets that have been determined to be related to recent edits, and therefore are presented as suggestions for editing. A first source code snippet in foo.cc transforms the function call "xrange" to "range" while preserving (via the placeholder X) argument(s) that are passed to the function. A second source code snippet in foo.cc a transformation template that wraps a KEYS call in a LIST call. Similarly, the file "bar.cc" also includes a number of potential edits that appear to be related to recently-made edits. In various implementations, the programmer may be able to select (e.g., click) any of the filenames and/or the source code snippets to be taken directly to the corresponding locations in source code. In various implementations, these transformations may be implemented automatically, or the user may have the option of accepting them, rejecting them, and/or modifying them.

Figure 7:
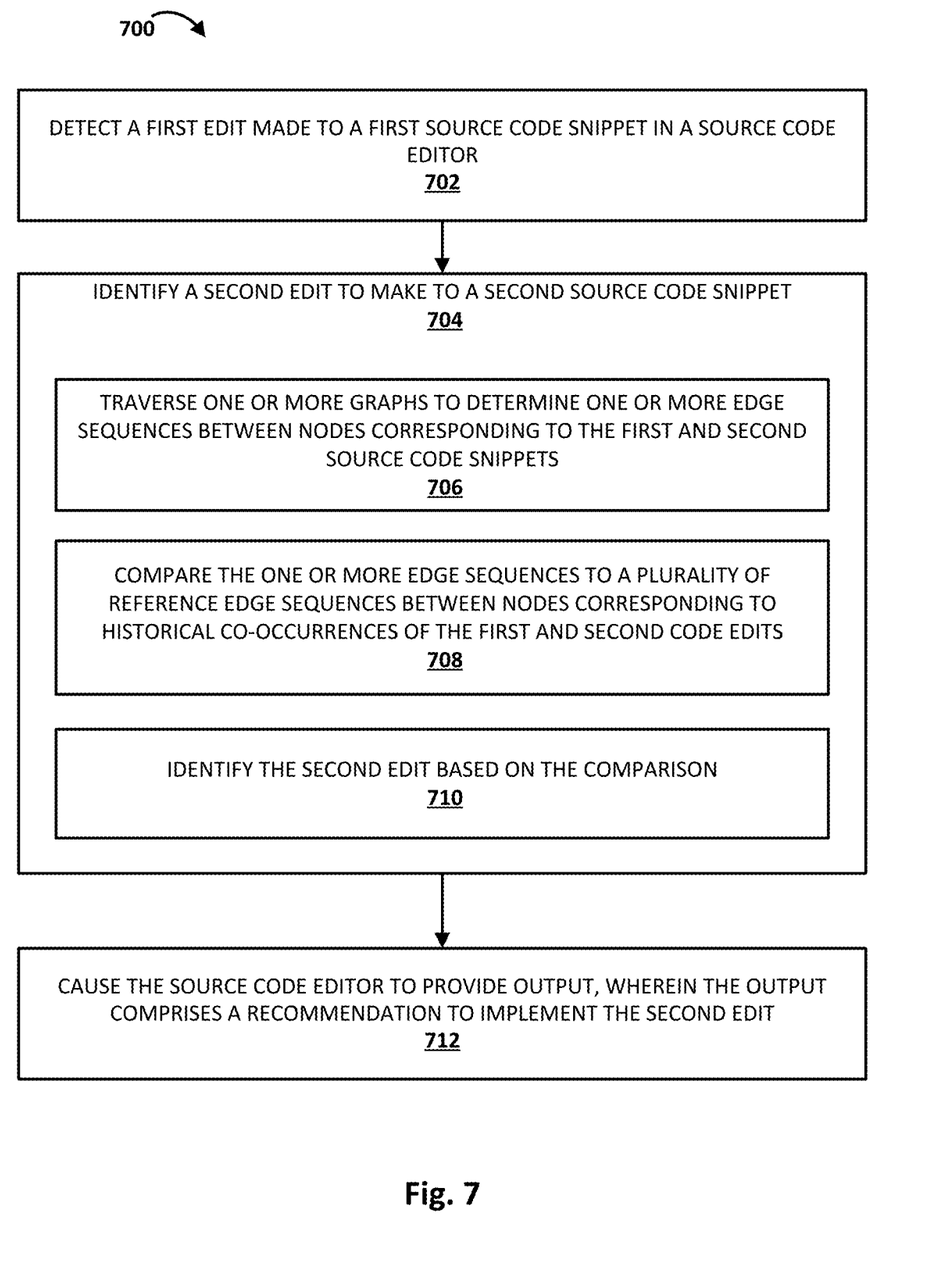
FIG. 7 depicts a flowchart illustrating an example method for practicing selected aspects of the present disclosure.

FIG. 7 is a flowchart illustrating an example method 700 of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 700 are shown in a particular order, this is not meant to be limiting. One or more operations may be reordered, omitted or added.

At block 702, the system may detect a first edit made to a first source code snippet in a source code editor. For example, a programmer operating IDE 111 may edit the first source code snippet using his or her keyboard and/or mouse, and/or other input components such as his or her voice. These changes may be detected in real time or near real time, or they may be detected upon an event such as the programmer saving the file, saving and closing the file, committing the file to VCS, etc.

At block 704, the system may identify a second edit to make to a second source code snippet. In various implementations, the identifying may include the operations of blocks 706-710. For instance, at block 706, the system, e.g., by way of graph module 104, may traverse one or more graphs to determine one or more edge sequences between nodes corresponding to the first and second source code snippets. As noted previously, these graphs may take various forms, such as ASTs, CFGs, file system directory trees, graphs of programmers connected by edges corresponding to relationships between them, etc.

At block 708, the system may compare the one or more edge sequences determined at block 706 to a plurality of reference edge sequences between nodes corresponding to historical co-occurrences of the first and second code edits. For example, a portion or percentage of the reference edge sequences that match (exact or fuzzy match as described previously) the one or more edge sequences between the nodes corresponding to the first and second source code edits may be determined and compared to a threshold, e.g., such as a threshold portion or percentage of a total number of instances in which either source code edit was made. Based on this comparison, and assuming the threshold is satisfied, at block 710, the system may identify the second edit as being related to the first edit.

At block 712, the system may cause the source code editor to provide output that includes, for instance, a recommendation to implement the second edit. Depending on the circumstances, this recommendation may be provided to a programmer in real time, e.g., in response to the programmer making the first edit. For example, the programmer may be presented with a notification such as a pop-up window that recommends the second edit and in some cases, includes a link to location in the source code file where the second edit is to be made. In other implementations, recommendation(s) may be provided to programmers in batches, e.g., similar to what was depicted in FIG. 6.

Figure 8:
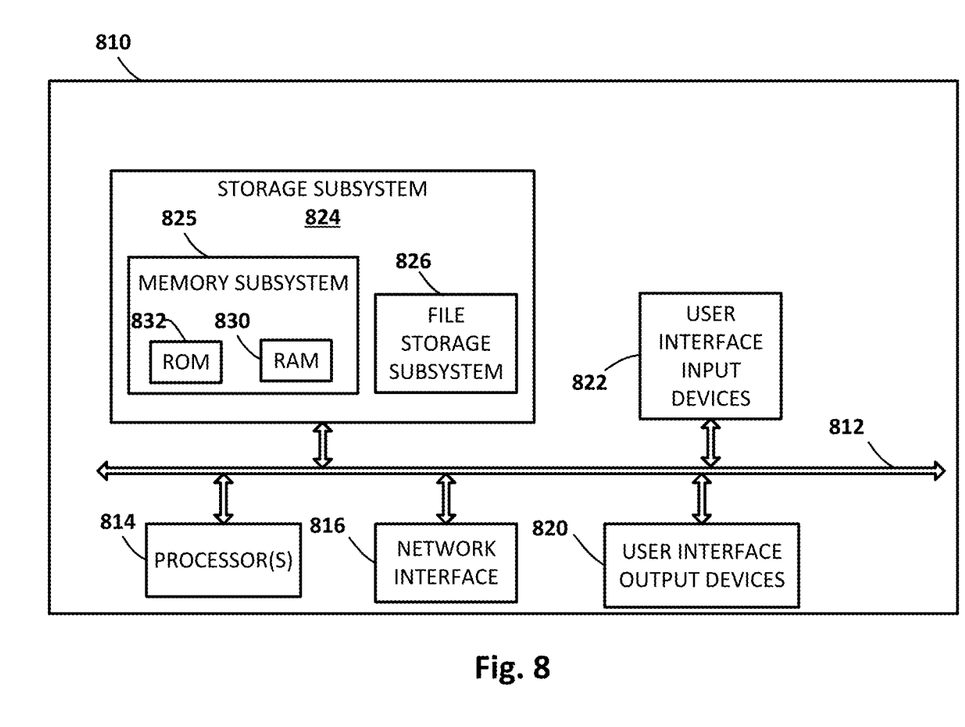
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 7, as well as to implement various components depicted in FIGS. 1 and 5.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   detecting a first edit made to a first source code snippet in a source code editor;
   identifying a second edit to make to a second source code snippet, wherein the identifying includes:
   traversing one or more graphs to determine one or more edge sequences between nodes corresponding to the first and second source code snippets,
   comparing the one or more edge sequences to a plurality of reference edge sequences between nodes corresponding to historical co-occurrences of the first and second code edits,
   determining the one or more edge sequences match the plurality of reference edge sequences of at least a threshold number or percentage of the historical co-occurrences of the first and second code edits, and identifying the second edit based on the comparing and the determining; and causing the source code editor to provide output, wherein the output comprises a recommendation to implement the second edit.

2. The method of claim 1, wherein the one or more graphs include a source code dependency graph between a first source code file containing the first source code snippet and a second source code file containing the second source code snippet.

3. The method of claim 1, wherein the one or more graphs include a file system tree that includes a first source code file containing the first source code snippet and a second source code file containing the second source code snippet.

4. The method of claim 1, wherein the one or more graphs include an abstract syntax tree generated based on the first and second source code snippets.

5. The method of claim 1, wherein the one or more graphs include a control flow graph or call graph generated based on the first and second source code snippets.

6. The method of claim 1, wherein the comparing comprises comparing one or more counts of the one or more edge sequences with a plurality of counts of the plurality of reference edge sequences.

7. The method of claim 1, wherein the comparing comprises comparing node sequences connected by the one or more edge sequences with a plurality of node sequences connected by the plurality of reference edge sequences.

8. The method of claim 1, wherein the nodes corresponding to the first and second source code snippets comprise semantic embeddings generated based on the first and second source code snippets.

9. The method of claim 1, wherein the nodes corresponding to the first and second source code snippets comprise semantic embeddings generated based on comments that accompany the first and second source code snippets.

10. A system comprising one or more processors and memory storing instructions that, in response to execution of the instructions, cause the one or more processors to:
  detect a first edit made to a first source code snippet in a source code editor;
  identify a second edit to make to a second source code snippet, wherein the instructions to identify include instructions to:
    traverse one or more graphs to determine one or more edge sequences between nodes corresponding to the first and second source code snippets,
    compare the one or more edge sequences to a plurality of reference edge sequences between nodes corresponding to historical co-occurrences of the first and second code edits,
    determine the one or more edge sequences match the plurality of reference edge sequences of at least a threshold number or percentage of the historical co-occurrences of the first and second code edits, and
    identify the second edit based on the comparing and the determine; and
  cause the source code editor to provide output, wherein the output comprises a recommendation to implement the second edit.

11. The system of claim 10, wherein the one or more graphs include a source code dependency graph between a first source code file containing the first source code snippet and a second source code file containing the second source code snippet.

12. The system of claim 10, wherein the one or more graphs include a file system tree that includes a first source code file containing the first source code snippet and a second source code file containing the second source code snippet.

13. The system of claim 10, wherein the one or more graphs include an abstract syntax tree generated based on the first and second source code snippets.

14. The system of claim 10, wherein the one or more graphs include a control flow graph or call graph generated based on the first and second source code snippets.

15. The system of claim 10, wherein the comparing comprises comparing one or more counts of the one or more edge sequences with a plurality of counts of the plurality of reference edge sequences.

16. The system of claim 10, wherein the comparing comprises comparing node sequences connected by the one or more edge sequences with a plurality of node sequences connected by the plurality of reference edge sequences.

17. The system of claim 10, wherein the nodes corresponding to the first and second source code snippets comprise semantic embeddings generated based on the first and second source code snippets.

18. At least one non-transitory computer-readable medium comprising instructions that, in response to execution of the instructions by one or more processors, cause the one or more processors to perform the following operations:
  detect a first edit made to a first source code snippet in a source code editor;
  identify a second edit to make to a second source code snippet, wherein the instructions to identify include instructions to:
    traverse one or more graphs to determine one or more edge sequences between nodes corresponding to the first and second source code snippets,
    compare the one or more edge sequences to a plurality of reference edge sequences between nodes corresponding to historical co-occurrences of the first and second code edits,
    determine the one or more edge sequences match the plurality of reference edge sequences of at least a threshold number or percentage of the historical co-occurrences of the first and second code edits, and
    identify the second edit based on the comparing and the determining; and
  cause the source code editor to provide output, wherein the output comprises a recommendation to implement the second edit.

* * * * *